UNITED STATES PATENT OFFICE.

ARTHUR WEINBERG, OF FRANKFORT-ON-THE-MAIN, PRUSSIA, GERMANY, ASSIGNOR TO LEOPOLD CASSELLA & CO., OF SAME PLACE.

PRODUCTION OF NEW DIAMIDO COMPOUNDS AND OF AZO COLORS PRODUCED THEREFROM.

SPECIFICATION forming part of Letters Patent No. 380,067, dated March 27, 1888.

Application filed November 29, 1887. Serial No. 256,414. (No specimens.)

*To all whom it may concern:*

Be it known that I, ARTHUR WEINBERG, doctor of philosophy, a subject of the Emperor of Germany, residing at the city of Frankfort-on-the-Main, in the Kingdom of Prussia, Germany, have invented new and useful Improvements in the Production of a New Class of Diamido Compounds and of Azo Colors Therefrom, of which the following is a specification.

The present invention relates to a process for the production of azo colors from new bases, which I call the ethers of "diamido-oxy-diphenyl" and of "diamido-oxy-phenyl-tolyl."

In carrying out my invention I proceed as follows:

*Production of the ethers of diamido-oxy-diphenyl and of diamido-oxy-phenyl-tolyl.*—By the combination of para-phenol-sulphonic acid with diazo-benzol and diazo-toluol, which combination only takes place in concentrated solution, coloring-matters are produced in which the hydroxyl group stands in the so-called ortho position to the azo group. These coloring-matters have a great tendency to crystallize. By treating the basic salts of these oxyazo compounds with the halogen ethers, or with ether-sulphuric salts, or with chloride of benzyl, I obtain ethers which contain methyl, aethyl, propyl, amyl, benzyl, substituting hydrogen in the OH group. I dissolve thirty kilograms benzol-azo-para-phenol-sulphonate of sodium in one hundred and fifty kilograms alcohol and four kilograms hydrate of sodium, and add eleven kilograms bromide of ethyl. After a few hours boiling the reaction is terminated. The thus-formed mono ethers are much less soluble in water than the coloring-matters from which I started—a circumstance which renders it easy to obtain them in a perfectly pure state. By treating the solutions of the etherified colors with reducing agents they are converted into mono-sulpho acids of the corresponding etherified oxy-diphenyl bases.

Example I: I mix the aqueous solution of 32.8 kilograms benzol-azo-phenol-sulphonate of sodium with a solution of nineteen kilograms chloride of tin in forty kilograms muriatic acid. After a short time the liquor is decolorized, the tin is separated by means of hydrosulphurous acid, or of zinc, and the aethoxy-benzidin-monosulphonic acid may be precipitated by cautious neutralization with either carbonate or acetate of soda. The following formula explains the reaction which takes place.

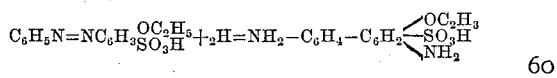

In quite analogous a manner the sulpho acids may be produced, deriving from the ethers of ortho-toluol-azo-phenol-para-sulphonic acid. In the place of chloride of tin in the above example, zinc-dust, hydrate of sodium, or other ingredients having a similar effect may be used. When heated with water, the monosulphonic acids of the new diamines can be converted into the neutral sulphates, according to the general formula:

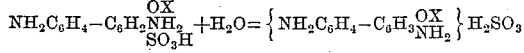

Example: In a closed vessel I heat 30.8 kilos aethoxy-benzidin-monosulphonic acid in one hundred liters water during six hours at 170° centigrade. After this the vessel will contain a mass of white crystals of sulphate of ortho-aethoxy-benzidin. The free base being insoluble in cold water, can be precipitated by soda. In a similar manner the other bases can be obtained.

*Production of the coloring-matter.*—For this purpose the ethers of the diamido-oxy-diphenyl and of the diamido-oxy-phenyl-tolyl are converted into tetrazo compounds and combined with amines, phenols, or the sulphonic or carbonic acids of these substances. The assymetric construction of my new bases makes them especially valuable for producing coloring-matters by the combination of the two azo groups with two different substances belonging to the classes of the amines or phenols.

A.—Yellow dyestuffs are produced by causing the tetrazo compounds derived from the new oxy-diamines to act upon phenol or a sulpho or carbo acid therefrom, or upon cresol or upon anilin or toluidin, or upon the mono-sulpho acids of the two last-named ones.

Example I: I dissolve 22.8 kilos diamido-aethoxy-diphenyl in water acidulated with sixty kilos muriatic acid, and convert them into the easily-soluble tetrazo compound by adding fourteen kilos nitrite of soda, and I pour the so-formed tetrazo compound into a solution of thirty-two kilos salicylate of sodium maintained alkaline by addition of caustic soda. After twelve hours' standing, the yellow dye-stuff, which is easily soluble in water, precipitates, and is separated by filtration.

Example II: 21.4 kilos diamido-methoxy-diphenyl I convert into the tetrazo compound by the above-described manner, and add them to a solution of 17.4 kilos sulphanilic acid kept neutral. As soon as the presence of tetrazo compound can no longer be observed, I add to the yellow precipitate a solution of ten kilos phenol or of eleven kilos cresol dissolved in caustic alkali. The dye formed is of a similar shade as the one produced by example I.

B.—Red dye-stuffs are produced by the reaction of the named tetrazo compounds upon alpha or beta naphthylamine or their mono and di sulphonic acids.

Example I: The tetrazo compound derived from 22.8 kilos diamido-methoxy-phenyl-tolyl I bring together with a solution of fifty kilos F naphthylamine-sulphonate of sodium and neutralize with acetate of soda. After some time standing the coloring-matter is formed. It is easily soluble in water and dyes cotton a bluish red.

Example II: The tetrazo compound of 22.8 kilos aethoxy-benzidin, combined in neutral solution with twenty-five kilos naphtionate of soda, forms an intermediate product insoluble in water, which is separated by filtration and added to a diluted solution of eighteen kilos muriate of naphthylamine. After twelve hours stirring the dye-stuff, which produces on cotton a nice bluish red, is formed.

C.—Orange-red dye-stuffs are formed by letting one molecule of the tetrazo compound of the above-mentioned bases react upon one molecule of the bodies named under A and one molecule of the bodies named under B.

Example: The tetrazo compound obtained from 25.5 kilos diamido-aethoxy-phenyl-tolyl I combine with twenty-five kilos naphtionate of sodium in aqueous solution. Then I add ten kilos phenol and some caustic soda to render the mixture alkaline. The dye-stuff will immediately be formed.

D.—Blue dye-stuffs are formed whenever the tetrazo compounds of the new bases react upon alpha or beta naphthol or upon the mono or the di sulphonic acids of the same.

Example I: 25.2 kilos diamido-aethoxy-phenyl-tolyl I diazotize and I pour the solution into a solution of fifty kilos alpha-naphthol-alpha-monosulphonate sodium. The dye-stuff is formed immediately. It dyes a fine greenish blue.

Example II: The tetrazo compound obtained, as in the foregoing example, I mix with thirty-six kilos beta-naphthol-disulphonate of sodium (salt R.) The red body thus formed I let react upon twenty-five kilos alpha-naphthol-alpha-monosulphonate of sodium, which produces a blue dye-stuff.

E.—Dye-stuffs of violet shades are produced by the combination of the tetrazo compounds of the new bases with one molecule of the bodies mentioned under D and one molecule of the bodies mentioned under A and B.

Example I: I combine the tetrazo-aethoxy-diphenyl obtained from 22.8 kilos of the corresponding base with eighteen kilos amido-benzol-sulphonate of soda. The insoluble compound thus formed I let react upon twenty-five kilos beta-naphthol-beta-monosulphonate of soda. The dye-stuff thus produced dyes a reddish-violet shade.

Example II: The tetrazo compound obtained, as in the foregoing example, I add to a solution of twenty-five kilos naphtionate of soda, and then I add a solution of twenty-five kilos alpha-naphthol-alpha-monosulphonate of soda. The dye-stuff thus produced dyes a violet shade.

Having thus described my invention, I claim as new and desire to secure by Letters Patent—

The process of producing azo colors, which consists in combining the ethers of the tetrazo-oxy-diphenyl and of the tetrazo-oxy-phenyl-tolyl with two equal or different molecules of an amine or of a phenol, or of a sulphonic or carbonic acid of an amine or of a phenol.

In testimony whereof I have signed my name to this specification in the presence of two subscribing witnesses.

ARTHUR WEINBERG.

Witnesses:
JACOB MUELLER,
HANS SIEBERT.